3,632,626
PROCESS FOR REMOVING INHIBITORS FROM
ALKENYL MONOMERS
John Schneller III, Metairie, and Teruko I. Todd, Kenner, La., assignors to American Cyanamid Company, Stamford, Conn.
No Drawing. Filed June 17, 1968, Ser. No. 737,360
Int. Cl. C07c 69/54, 121/32
U.S. Cl. 260—465.9 R  10 Claims

ABSTRACT OF THE DISCLOSURE

A process is provided for removal of phenolic polymerization inhibitors from alkenyl monomers. The process includes first contacting the monomer with a highly porous, strongly basic, quaternary ammonium anion exchange resin in the salt form to remove a major portion of the inhibitor, and subsequently contacting the monomer with a highly porous, weakly basic, tertiary amine anion exchange resin in the hydroxide form to produce a monomer product substantially free of the inhibitor.

---

This invention relates to an improved process for the removal of phenolic polymerization inhibitors from alkenyl monomers, and more particularly, to an improved process for the removal of hydroquinone from methyl methacrylate monomer.

In the past, phenolic polymerization inhibitors have been removed from alkenyl monomers by washing with caustic or by costly distillation. Such treatments, however, have not been entirely satisfactory, both from the standpoint of efficiency of removal and economy of operation.

Recently, it has been found that these inhibitors can be more effectively removed from alkenyl monomers by contacting the monomers with the salt form of a strongly basic, quaternary ammonium anion exchange resin, and in particular with highly porous resins having a so-called macroreticular structure. These highly porous resins have been found to be both efficient and economical in producing alkenyl monomers having inhibitor levels around 2 parts per million (p.p.m.).

In some cases, such low inhibitor levels can be tolerated because the small amount of inhibitor can be compensated for by adding an excess of catalyst to destroy its inhibiting properties and permit polymerization of the monomer.

In other instances, however, substantially inhibitor-free monomers must be used, particularly in the production of transparent, optically clear plastic sheets. The presence of even small amounts of inhibitor can cause discoloration of such sheets. Known procedures utilizing anion exchange resins have not heretofore been capable of economically reducing the polymerization inhibitor content to the very low levels required for such uses—generally below about 0.2 p.p.m.

In accordance with this invention, it has been found that an efficient and economical process for the removal of phenolic polymerization inhibitors from alkenyl monomers can be provided by initially contacting the monomer with a strongly basic, quaternary ammonium anion exchange resin in the salt form, to remove a major portion of the inhibitor present in the monomer, and thereafter contacting the treated monomer with a weakly basic, tertiary amine anion exchange resin in the hydroxide form.

The salt of the quaternary ammonium anion exchange resin used in the first step of the present process can be chloride, sulfate, nitrate, carbonate, bicarbonate, or phosphate, and, preferably, is chloride. The anion exchange resins used in both steps of the process of this invention are preferably highly porous resins having a macroreticular structure.

The dual-resin treatment of alkenyl monomers in accordance with this invention produces a substantially inhibitor-free alkenyl monomer product, in which the concentration of the inhibitor generally has been reduced to less than about 0.2 part per million.

The process of this invention thus achieves effective removal of phenolic polymerization inhibitors from alkenyl monomers to very low levels, permitting the monomer to be used in such demanding end uses as the production of optically clear products. Other advantages achieved by the process include: reduction of the amount of catalyst required for subsequent polymerization of the monomer, due to the removal of substantially all of the polymerization inhibitor in the present process; and efficient and economical operation based on the ability of the process to be operated continuously to produce large quantities of substantially inhibitor-free alkenyl monomer before the resins require regeneration.

It is to be understood that both the foregoing general description and the following detailed description are exemplary and explanatory but are not restrictive of the invention.

Alkenyl monomers which can be treated in accordance with the process of this invention include a wide variety of acrylates and methacrylates, such as methyl, ethyl and n-propyl methacrylate, and methyl and ethyl acrylate; and vinyl compounds, such as styrene, α-methylstyrene, ethyl styrene, chlorostyrene, vinyl toluene, vinyl chloride, vinylidine chloride, vinyl stearate, acrylonitrile, divinylbenzene, trivinylbenzene, vinyl naphthalene, and the like. Mixtures of two or more of such monomers can, of course, also be treated in accordance with this invention.

Typical phenolic inhibitors which are added to such alkenyl monomers to prevent their premature polymerization, include t-butyl catechol, hydroquinone, the monomethyl ether of hydroquinone, di-t-butyl-hydroquinone, 1,4-naphthoquinone, 4,6-dinitro-o-cresol, 2,6-di-isopropyl-o-cresol, 3,6-dimethoxyphenol, o-nitrophenol, o-phenylphenol, and the like, and mixtures thereof.

In accordance with the process of this invention, these phenolic polymerization inhibitors are removed from the alkenyl monomers by initially contacting the monomer with a strongly basic, quaternary ammonium anion exchange resin in the salt form to remove a major portion of the inhibitor from the monomer. Suitable salt forms of these anion exchange resins include the chloride, sulfate, nitrate, carbonate, bicarbonate, and phosphate forms.

The preparation of these strongly basic resins and their use in the removal of polymerization inhibitors from alkenyl monomers is known and is described, for example, in U.S. Pat. 3,247,242.

Amberlyst A–27, from the Rohm and Haas Company, a highly porous, macroreticular-structured, strongly basic, quaternary ammonium anion exchange resin in the chloride form, is a preferred resin for use in the first step of the process of this invention. These quaternary resins can be regenerated by merely passing water down through the resin bed.

These quaternary ammonium anion exchange resins are used in the first step of the process of this invention to remove a major portion of the inhibitor initially present in the monomer, and to provide a treated monomer having an inhibitor concentration of approximately 2 p.p.m.

To further reduce the inhibitor level in the treated monomer, in accordance with the invention, the treated monomer from the first step is recovered and thereafter contacted with a weakly basic, tertiary amine anion exchange resin in the free base or hydroxide form. This weakly basic, anion exchange resin has been found to be especially effective when used in combination with the strongly basic, quaternary ammonium anion exchange resins described above in consecutive treatment steps to produce a substantially inhibitor-free alkenyl monomer product which generally has an inhibitor concentration of less than about 0.2 p.p.m.

It has been found that the serial use of these two resins markedly increases the total inhibitor removal capacity of the system before regeneration of the resins is required. Such removal capacity cannot be achieved by either resin alone, and their serial use provides a highly efficient and economical process for the removal of polymerization inhibitors.

The weakly basic, tertiary amine anion exchange resins used in the process of this invention are preferably highly porous resins prepared by initially copolymerizing a monoethylenically unsaturated monomer, such as styrene, with a polyvinyl monomer, such as divinylbenzene, in the presence of a compound that is a solvent for the monomer mixture but a non-solvent for the copolymer, and then aminating the copolymer. Suitable solvents for the copolymerization reaction include alkanols having a carbon content of from about $C_4$ to $C_{10}$. The highly porous copolymer is aminated with a secondary amine to produce a tertiary amine anion exchange resin. This resin is used in the free base or hydroxide form.

A preferred resin for use in the second step of the process of this invention is Amberlyst A–21 from the Rohm and Haas Company, a highly porous, macroreticular-structured, weakly basic, tertiary amine anion exchange resin in the free base form. The resin can be regenerated after exhaustion by passing caustic down through the resin bed.

In accordance with a preferred embodiment of this invention, methyl methacrylate monomer containing, for example, approximately 20 p.p.m. or more of hydroquinone is first passed through a resin bed of a strongly basic, quaternary ammonium anion exchange resin in the chloride form to produce a treated monomer effluent containing approximately 2 p.p.m. of hydroquinone. The effluent is then passed through a second resin bed of a weakly basic, tertiary amine anion exchange resin in the free base form to produce a final methyl methacrylate monomer effluent containing less than 0.2 p.p.m. of hydroquinone.

The process of this invention may be carried out by batch, or continuous process techniques. In a preferred continuous process, monomer containing a polymerization inhibitor is continuously fed to a system of fixed beds or columns of resin and treated monomer is continuously withdrawn from the column as effluent. It is necessary to periodically interrupt the process and regenerate the resin, and two systems of columns can be run in tandem if a completely continuous process is desired.

Applying continuous process techniques to the process of this invention, a strongly basic, quaternary ammonium anion exchange resin in the salt form is charged into a first column or bed and a weakly basic, tertiary amine resin in the hydroxide form is charged to a second column or bed. The inlet conduit to the second bed is connected to the outlet conduit from the first bed to allow serial flow of the monomer through the two beds during exhaustion operations.

Suitable connections to the beds are also provided to allow different fluids to be fed to the resin beds to perform the backwash, regeneration, and rinse operations required for each resin. Backwashing is desirable to eliminate air pockets and to classify the beds. Water can be used in the backwash operation, but after backwashing, the water should be removed with an organic solvent, such as methanol.

The temperature at which the inhibitor is removed has little effect on either the capacity or rate of adsorption of the system of this invention. It is generally only necessary to keep the monomer a liquid and to prevent decomposition of the anion exchange resins, and therefore ambient temperatures, i.e., 20 to 30° C., can be used in the process of this invention.

While the process of this invention has been described in relation to a fixed-resin bed system, it is to be understood that the process is equally applicable to a moving bed system.

For a clearer understanding of this invention, specific examples of it are set forth below. In discussing the capacity of the resins in these examples, the term "bed volume" is used to denote a volume of liquid monomer equal to the total volume of the resin bed or combinations of beds. The examples are merely illustrative and are not intended to limit the scope and underlying principles of the invention in any way.

EXAMPLE 1

Methyl methacrylate monomer containing 20 p.p.m. of hydroquinone (HQ) is passed through a first glass column containing 300 ml. of Amberlyst A–27 resin, a highly porous, strongly basic, quaternary ammonium anion exchange resin in the chloride form. The monomer is fed through the bed at a flow rate of about 2 to 4 bed volumes per hour. The effluent from this column contains approximately 2 p.p.m. HQ.

This effluent is passed, at the same flow rate, through a second glass column containing 300 ml. of Amberlyst A–21 resin, a highly porous, weakly basic, tertiary amine anion exchange resin in the hydroxide form. The effluent from this bed is analyzed and found to contain less than 0.2 p.p.m. HQ.

Additional quantities of the methyl methacrylate monomer are passed through the resins in series until the HQ content of the final effluent begins to exceed 0.2 p.p.m. The total bed volumes of methyl methacrylate treated to break through, based on the total volume of the two resins, is found to be about 600.

After regenertaion of the first column with water and the second column with 4% sodium hydroxide, the efficiency and capacity of the resins is restored.

EXAMPLE 2

Methyl methacrylate monomer containing 20–25 p.p.m. hydroquinone (HQ) is passed through a bed of Amberlyst A–27 resin at a flow rate of 2 BV per hour. The initial HQ concentration in the effluent is about 1 p.p.m., but after only about 75 bed volumes of monomer has passed through the resin, the HQ content of the effluent is found to exceed 2 p.p.m.

The same starting methyl methacrylate monomer is passed through a bed of Amberlyst A–21 resin at a flow rate of 2 BV per hour until the HQ content of the effluent exceeds 0.2 p.p.m. The breakthrough point is found to occur after only about 105 bed volumes of monomer has passed through this resin.

This example, therefore, shows that the capacity of the dual-resin bed system of this invention using Amberlyst A–27 and A–21 resins in series is markedly superior to the capacity of a system using only one of these two types of resins.

EXAMPLE 3

The procedure of Example 1 is repeated with ethyl acrylate monomer containing inhibiting amounts of the monomethyl ether of hydroquinone. The results achieved in this example are comparable to those obtained in Example 1.

EXAMPLES 4–6

Styrene, acrylonitrile, and divinylbenzene monomers containing inhibiting amounts of t-butyl catechol are each treated in accordance with the procedure of Example 1. In each case removal of the inhibitors from the monomer is on the order of that achieved in Example 1.

What is claimed is:

1. A process for the removal of phenolic polymerization inhibitors from monomers having polymerizable alkenyl groups, comprising contacting the monomer with a strongly basic, quaternary ammonium anion exchange resin in the salt form to remove a major portion of the inhibitor present in the monomer, said salt being selected from the group consisting of chloride, sulfate, nitrate, carbonate, bicarbonate, and phosphate, thereafter contacting the treated monomer with a weakly basic, tertiary amine anion exchange resin in the hydroxide form and recovering the purified monomer.

2. The process of claim 1, wherein the monomer is methyl methacrylate.

3. The process of claim 1, wherein the monomer is acrylonitrile.

4. The process of claim 1, wherein the monomer is styrene.

5. The process of claim 1, wherein the monomer is ethyl acrylate.

6. The process of claim 1, wherein the quaternary ammonium anion exchange resin is in the chloride form.

7. The process of claim 1, wherein the inhibitor is hydroquinone.

8. The process of claim 1, wherein the inhibitor is t-butyl catechol.

9. The process of claim 2, wherein hydroquinone is removed from methyl methacrylate monomer to produce a methyl methacrylate monomer product containing less than about 0.2 part per million of hydroquinone.

10. The process of claim 1, wherein both anion exchange resins are highly porous and have a macroreticular structure.

References Cited

UNITED STATES PATENTS

| | | | |
|---|---|---|---|
| 2,946,758 | 7/1960 | Zenftman | 260—486 X |
| 3,247,242 | 4/1966 | McGarrey et al. | 260—486 |

LORRAINE A. WEINBERGER, Primary Examiner

P. J. KILLOS, Assistant Examiner

U.S. Cl. X.R.

260—410.9, 486 R, 651 R, 656 R, 669 A